United States Patent
Farooq et al.

(10) Patent No.: US 11,945,395 B1
(45) Date of Patent: Apr. 2, 2024

(54) VEHICLE AIRBAG SYSTEM

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/065,670

(22) Filed: Dec. 14, 2022

(51) Int. Cl.
*B60R 21/233* (2006.01)
*B60R 21/231* (2011.01)
*B60R 21/2338* (2011.01)
*B60R 21/235* (2006.01)

(52) U.S. Cl.
CPC ........ *B60R 21/233* (2013.01); *B60R 21/2338* (2013.01); *B60R 2021/23161* (2013.01); *B60R 2021/23308* (2013.01); *B60R 2021/23382* (2013.01); *B60R 2021/23509* (2013.01); *B60R 2021/23542* (2013.01)

(58) Field of Classification Search
CPC .............. B60R 21/233; B60R 21/2338; B60R 2021/23161; B60R 2021/23308; B60R 2021/23382; B60R 2021/23509; B60R 2021/23542; B60R 2021/23386
See application file for complete search history.

(56) References Cited

U.S. PATENT DOCUMENTS

| | | | |
|---|---|---|---|
| 5,104,727 A | 4/1992 | Wnenchak | |
| 5,609,363 A | 3/1997 | Finelli | |
| 5,746,447 A | 5/1998 | Dyer et al. | |
| 5,957,485 A * | 9/1999 | Hirai | B60R 21/233 |
| | | | 280/743.1 |
| 6,355,123 B1 | 3/2002 | Baker et al. | |
| 6,454,300 B1 | 9/2002 | Dunkle et al. | |
| 6,581,961 B1 | 6/2003 | Bowers | |
| 6,767,030 B2 | 7/2004 | Yamaji et al. | |
| 7,163,234 B2 | 1/2007 | Hier et al. | |

(Continued)

FOREIGN PATENT DOCUMENTS

| | | |
|---|---|---|
| FR | 2876334 A1 | 4/2006 |
| FR | 2931420 A1 | 11/2009 |
| WO | 2005120905 A2 | 12/2005 |

OTHER PUBLICATIONS

Non-Final Office Action dated Mar. 30, 2023, U.S. Appl. No. 17/932,680, filed Sep. 16, 2022.

(Continued)

*Primary Examiner* — Paul N Dickson
*Assistant Examiner* — Matthew Joseph Ganci
(74) *Attorney, Agent, or Firm* — Frank A. MacKenzie; Bejin Bieneman PLC (57) ABSTRACT

A vehicle includes a bulkhead elongated along an axis. The vehicle includes a base supported by the bulkhead and inflatable from a stowed position away from the bulkhead to a deployed position. The vehicle includes an airbag supported by the base and inflatable away from the bulkhead and the base to an inflated position, the airbag in the inflated position having a main portion and extensions extending away from the main portion along a vehicle-longitudinal axis, the extensions being spaced from each other along the axis.

19 Claims, 7 Drawing Sheets

(56) References Cited

U.S. PATENT DOCUMENTS

| | | | |
|---|---|---|---|
| 9,205,795 B1 | 12/2015 | Cheng et al. | |
| 9,487,177 B2 | 11/2016 | Schneider et al. | |
| 10,336,279 B2 | 7/2019 | Farooq et al. | |
| 10,596,992 B2 * | 3/2020 | Choi | B60R 21/2338 |
| 10,882,487 B2 | 1/2021 | White et al. | |
| 11,345,305 B2 | 5/2022 | Fischer et al. | |
| 11,358,551 B1 * | 6/2022 | Deng | B60R 21/205 |
| 2002/0158456 A1 | 10/2002 | Fischer | |
| 2009/0200777 A1 | 8/2009 | Webber et al. | |
| 2015/0066308 A1 | 3/2015 | Nagasawa | |
| 2017/0282840 A1 * | 10/2017 | Pendse | B60R 21/2338 |
| 2017/0282841 A1 | 10/2017 | Hayashi et al. | |
| 2018/0361978 A1 * | 12/2018 | Belwafa | B60R 21/233 |
| 2020/0017058 A1 | 1/2020 | Jaradi et al. | |
| 2020/0094770 A1 | 3/2020 | Fischer et al. | |
| 2020/0122675 A1 * | 4/2020 | Perez | B60R 21/203 |
| 2020/0247350 A1 | 8/2020 | Hosoe | |
| 2020/0377052 A1 | 12/2020 | Youssef-Agha et al. | |
| 2021/0023966 A1 | 1/2021 | Kanegae et al. | |
| 2022/0080917 A1 | 3/2022 | Sakurai | |
| 2022/0250576 A1 | 8/2022 | Farooq et al. | |
| 2022/0274554 A1 | 9/2022 | Jaradi et al. | |

OTHER PUBLICATIONS

Non-Final Office Action dated Jun. 23, 2023, U.S. Appl. No. 17/932,680, filed Sep. 16, 2022.

* cited by examiner

VEHICLE AIRBAG SYSTEM

BACKGROUND

A vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A vehicle includes a bulkhead elongated along an axis. The vehicle includes a base supported by the bulkhead and inflatable from a stowed position away from the bulkhead to a deployed position. The vehicle includes an airbag supported by the base and inflatable away from the bulkhead and the base to an inflated position, the airbag in the inflated position having a main portion and extensions extending away from the main portion along a vehicle-longitudinal axis, the extensions being spaced from each other along the axis.

The base may include side walls that define an inflation chamber and are a thermoplastic elastomer, and the airbag may include woven fabric that defines a second inflation chamber.

The main portion of the airbag in the inflated position may define a main chamber and the extensions of the airbag in the inflated position define extension chambers, and the airbag in the inflated position may include internal panels separating the main chamber from the extension chambers.

The internal panels may include one-way valves that permit fluid flow into the extension chambers and inhibit fluid flow out of the extension chambers.

The vehicle may include a first seat and a second seat, and the extensions may include a first extension outboard of the first seat, a second extension outboard of the second seat, and a third extension between the first seat and the second seat.

The airbag may include an impact panel between the first extension and the second extension, and the impact panel may be concave away from the first seat.

The airbag may include an internal tether fixed to the impact panel between the first extension and the second extension.

The extensions may include distal ends, and the airbag may include internal tethers fixed to the distal ends of the extensions.

The internal tethers may extend into the main chamber.

The vehicle may include a second base supported by the bulkhead and inflatable from a second stowed position away from the bulkhead to a second deployed position, the airbag supported by the second base.

The base may be spaced from the second base along the axis.

The vehicle may include an external tether fixed to the airbag and the bulkhead.

The vehicle may include an inflator in fluid communication with the airbag and the base.

The vehicle may include a seat facing the bulkhead, the seat having a seatback, the seatback being reclinable, the airbag in the inflated position being in front of the seat.

The vehicle may include a computer having a processor and a memory storing instructions executable by the processor to, in response to detecting both that a recline angle of the seatback is greater than a threshold and an impact to the vehicle, command the base to the deployed position and the airbag to the inflated position.

A vehicle includes a bulkhead. The vehicle includes a first base supported by the bulkhead and inflatable from a stowed position away from the bulkhead to a deployed position. The vehicle includes a second base supported by the bulkhead and inflatable from a second stowed position away from the bulkhead to a second deployed position. The vehicle includes an airbag supported by the first base and the second base, the airbag inflatable away from the bulkhead and the base to an inflated position.

The first base may define a first base chamber and the second base may define a second base chamber fluidly separated from the first base chamber.

The vehicle may include an inflator in fluid communication with the first base, the second base, and the airbag.

The first base and the second base may each include thermoplastic and the airbag includes woven fabric.

The vehicle may include a first tether fixed to the airbag and fixed to the bulkhead at the first base, and may include a second tether fixed to the airbag and fixed to the bulkhead at the second base.

With reference to the Figures, wherein like numerals indicate like parts throughout the several views, a vehicle 20 having a bulkhead 22 is shown. The bulkhead 22 is elongated along an axis BA. The vehicle 20 includes a deployable base 24a, 24b supported by the bulkhead 22 and inflatable from a stowed position away from the bulkhead 22 to a deployed position. The vehicle 20 includes an airbag 26 supported by the deployable base 24a, 24b and inflatable away from the bulkhead 22 and the deployable base 24a, 24b to an inflated position. The airbag 26 in the inflated position has a main portion 28 and extensions 30a, 30b, 30c extending away from the main portion 28 along a vehicle-longitudinal axis VA1. The extensions 30a, 30b, 30c are spaced from each other along the axis BA.

Selective inflation of the deployable base 24a, 24b, e.g., depending on a seatback angle of a seat 32a, 32b of the vehicle 20, positions the airbag 26 relative to the seat 32a, 32b to control kinematics of an occupant of the seat 32a, 32b during certain impacts to the vehicle 20. The extensions 30a, 30b, 30c may control cross-vehicle kinematics of the occupants.

The vehicle 20 may be any suitable type of ground vehicle, e.g., a passenger or commercial automobile such as a sedan, a coupe, a truck, a sport utility, a crossover, a van, a minivan, a taxi, a bus, etc. The vehicle 20 defines a passenger compartment to house occupants, if any, of the vehicle 20. The passenger compartment may extend across the vehicle 20, i.e., from a right-side RS to a left-side LS of the vehicle 20. The passenger compartment includes a front end and a rear end with the front end being in front of the rear end during forward movement of the vehicle 20.

The vehicle 20 defines a lateral axis VA2 extending between the left-side LS and the right-side RS of the vehicle 20. The vehicle 20 defines a longitudinal axis VA1 extending between a front and a rear of the vehicle 20. The vehicle 20 defines a vertical axis A3 extending between a top and a bottom of the vehicle 20. The longitudinal axis VA1, the lateral axis VA2, and the vertical axis VA3 are perpendicular relative to each other.

As set forth above, the vehicle 20 includes one or more bulkheads 22. In the example shown in the Figures, the vehicle 20 includes one bulkhead 22 at the front end of the passenger cabin. In another example, additional or alternate, a bulkhead may be at the rear end of the passenger cabin. In such an example, the bulkheads 22 may be identical or different. The bulkheads 22 are elongated along the axis BA, e.g., along the lateral axis VA2 of the vehicle 20. In other words, the bulkheads 22 may be longer along the lateral axis VA2 than along the longitudinal axis VA1 or the vertical axis VA3. The bulkhead 22 may extend from a pillar on the right-side RS of the vehicle 20 to a pillar on the left-side LS of the vehicle 20. In other words, the bulkhead 22 may extend completely across the passenger cabin along the lateral axis VA2. The bulkhead 22 may extend from a floor of the passenger cabin to a front windshield (or rear windshield), e.g., along the vertical axis VA3 of the vehicle 20. The bulkhead 22 may include an instrument panel. The instrument panel may include one or more instruments such as gauges, displays, a user interface, etc. The instrument panel may be elongated along the lateral axis VA2 from the left-side LS of the vehicle 20 to the right-side RS of the vehicle 20. The instrument panel presents information to and may receive information from an occupant of the vehicle 20. The instrument panel may include dials, digital readouts, screens such as a touch-sensitive display screen, speakers, buttons, knobs, keypads, microphone, and so on for providing information to, and receiving information from, the occupant. The instrument panel may support vehicle controls, including a steering wheel.

The vehicle 20 includes one or more seats 32a, 32b. Each seat 32a, 32b includes a seatback 34 and a seat bottom 36. The vehicle 20 may include any suitable number of seats 32a, 32b. The seats 32a, 32b may be arranged in the passenger cabin in any suitable position, i.e., as front seats 32a, 32bs, rear seats, third-row seats, etc. The seats 32a, 32b may be movable relative to the floor to various positions, e.g., movable fore-and-aft and/or cross-vehicle. The seats 32a, 32b may be of any suitable type, e.g., a bucket seat. One or more seats 32a, 32b face the bulkhead 22. In other words, one or more of the seats 32a, 32b are positioned relative to the bulkhead 22 such that occupants face the bulkhead 22 when seated on top surfaces 38 of the seat bottoms 36 and with their backs against the seatbacks 34 of the seat 32a, 32bs. For example, a first seat 32a and a second seat 32b may be positioned as front seats arranged along the lateral axis VA2, e.g., with a center console therebetween.

The seatback 34 of the seat 32a, 32b is supported by the seat bottom 36 of the seat 32a, 32b. The seatback 34 and the seat bottom 36 may be adjustable in multiple degrees of freedom. Specifically, the seatback 34 and the seat bottom 36 may themselves be adjustable, in other words, adjustable components within the seatback 34 and/or the seat bottom 36, and/or may be adjustable relative to each other. The seatback 34 is reclinable relative to the seat bottom 36, e.g., between an upright position (shown in dashed lines in FIG. 1) and a reclined position (shown in solid lines in FIG. 1). The seatback 34 in the upright position is generally vertical, e.g., within 20 degrees of parallel to the vertical axis VA3. The seatback 34 in the reclined position is at a shallower angle than in the upright position. For example, the seatback 34 in the reclined position may be greater than 20 degrees from being parallel with the vertical axis VA3. While all modern OEMs of passenger vehicles currently warn occupants against reclining the seat past a certain angle while the vehicle is moving and/or in riding in a fully reclined or supine position due to safety concerns, it is anticipated that technology and the regulatory framework may evolve in the future where such an activity is permissible.

The seatback 34 and the seat bottom 36 may each include a frame and a covering supported on the frame. Specifically, the frame of the seatback 34 may include a pair of upright frame members. The upright frame members are elongated, and specifically, are elongated in a generally upright direction when the seatback 34 is in a generally upright position. The upright frame members are spaced from each other, and the seatback 34 frame includes cross-members not shown extending between the upright frame members. The frame of the seat bottom 36 may include beams, pans, etc. The frames of the seat bottom 36 and the seatback 34 may be of any suitable plastic material, e.g., carbon fiber reinforced plastic CFRP, glass fiber-reinforced semi-finished thermoplastic composite organosheet, etc. As another example, some or all components of the frames may be formed of a suitable metal, e.g., steel, aluminum, etc. The covering may include upholstery and padding. The upholstery may be cloth, leather, faux leather, or any other suitable material. The upholstery may be stitched in panels around the frames. The padding may be between the coverings and the frames and may be foam or any other suitable material.

The vehicle 20 includes one or more deployable bases 24a, 24b, e.g., a first deployable base 24a and a second deployable base 24b (shown in FIG. 4), that may be inflated to re-position the airbag 26 closer to the seat 32a, 32b. Each deployable base 24a, 24b is inflatable from the stowed position, shown in FIGS. 1 and 2, to the deployed position, shown in FIGS. 3-5. Each deployable base 24a, 24b in the inflated position extends away from the bulkhead 22, e.g., toward the seat 32a, 32bs and along the longitudinal axis VA1. Each deployable base 24a, 24b is supported by the bulkhead 22. The deployable bases 24a, 24b may be fixed to the bulkhead 22, e.g., with fasteners such as threaded fasteners, push-pins, Christmas-tree fasteners, adhesive, etc. The vehicle may include more or less deployable bases 24a, 24b than shown, e.g., a single deployable base 24a elongated along the bulkhead 22 (as shown in FIGS. 1-4), a first deployable base 24a and a second deployable base 24b spaced from each other along the lateral axis VA2 (as shown in Figure or three or more deployable bases arranged along the bulkhead 22 (not shown).

Figure 5:
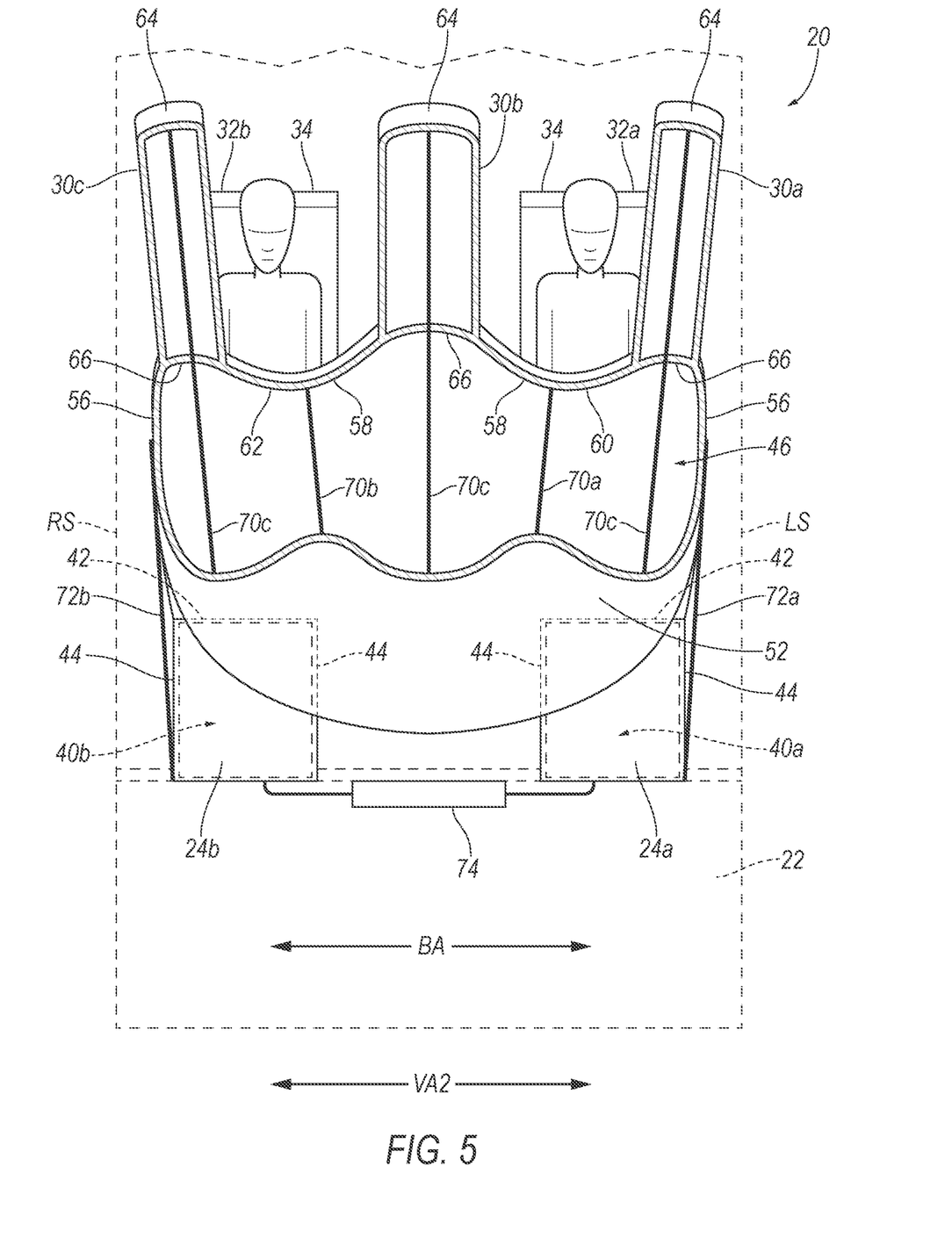
FIG. 5 is a top perspective view of a pair deployable bases in deployed positions supporting the airbag in the inflated position with the break away to show the internal tethers of the airbag.

With reference to FIG. 5, the first deployable base 24a may be spaced from the second deployable base 24b along the lateral axis VA2. For example, first deployable base 24a may be at the right-side RS and the second deployable base 24b may be at the left-side LS. The first deployable base 24a and the second deployable base 24b may require less inflation medium (e.g., compared to a single deployable base that extends from the right-side RS to the left-side LS) to inflate to the deployed position and move the airbag 26 toward the seat 32a, 32bs. The first deployable base 24a may be in front of the first seat 32a and the second deployable base 24b may be in front of the second seat 32a. In other words, the first deployable base 24a may be spaced from the first seat 32a the longitudinal axis VA1 and overlap the first seat 32a along the lateral axis VA2. Likewise, the second deployable base 24b may be spaced from the second seat 32b along the longitudinal axis VA1 and overlap the second seat 32b along the lateral axis VA2.

Figure 3:
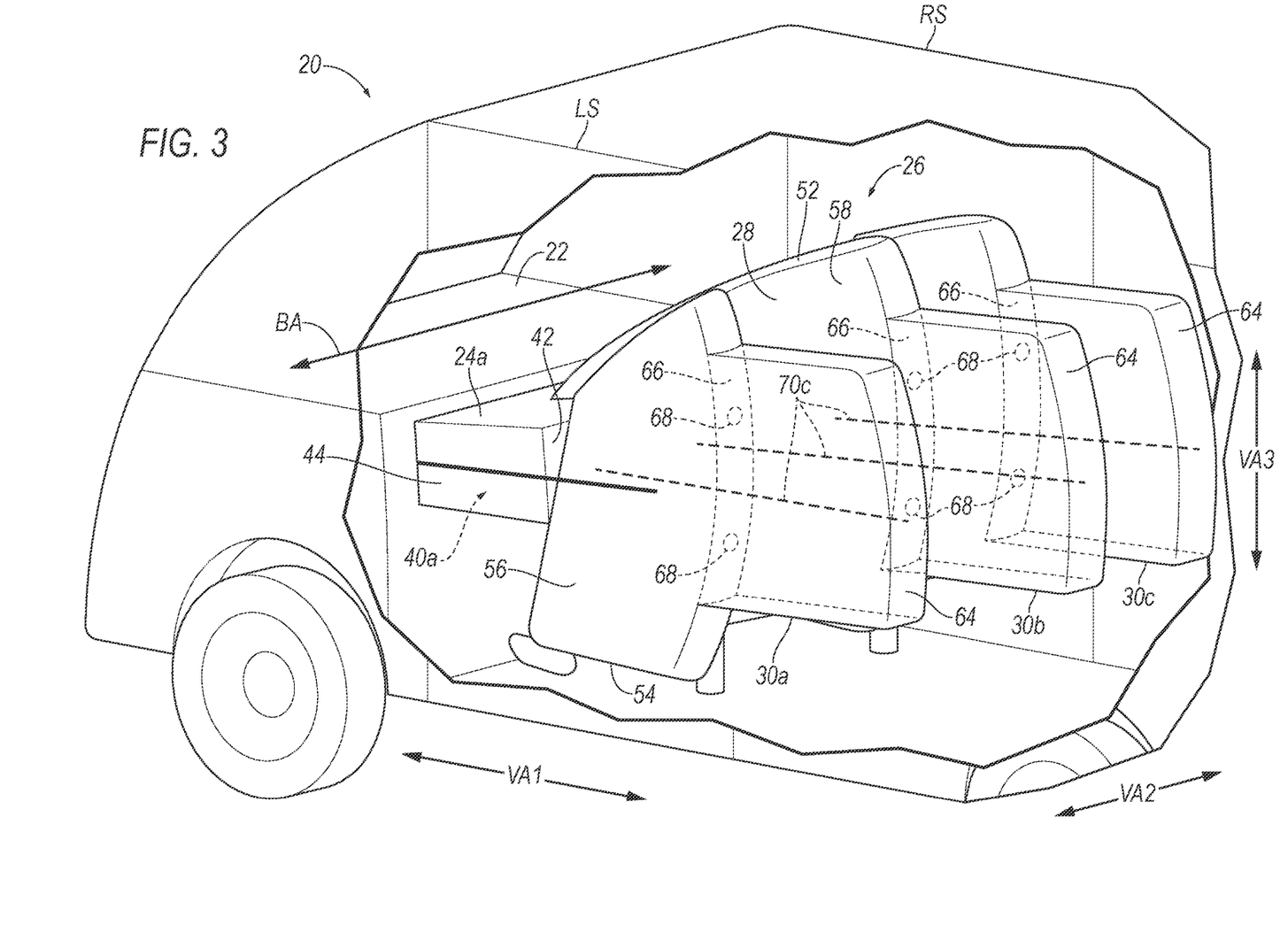
FIG. 3 is a perspective view of the portion of the vehicle of FIG. 1 with the deployable base in a deployed position supporting the airbag in the inflated position.
Figure 4:
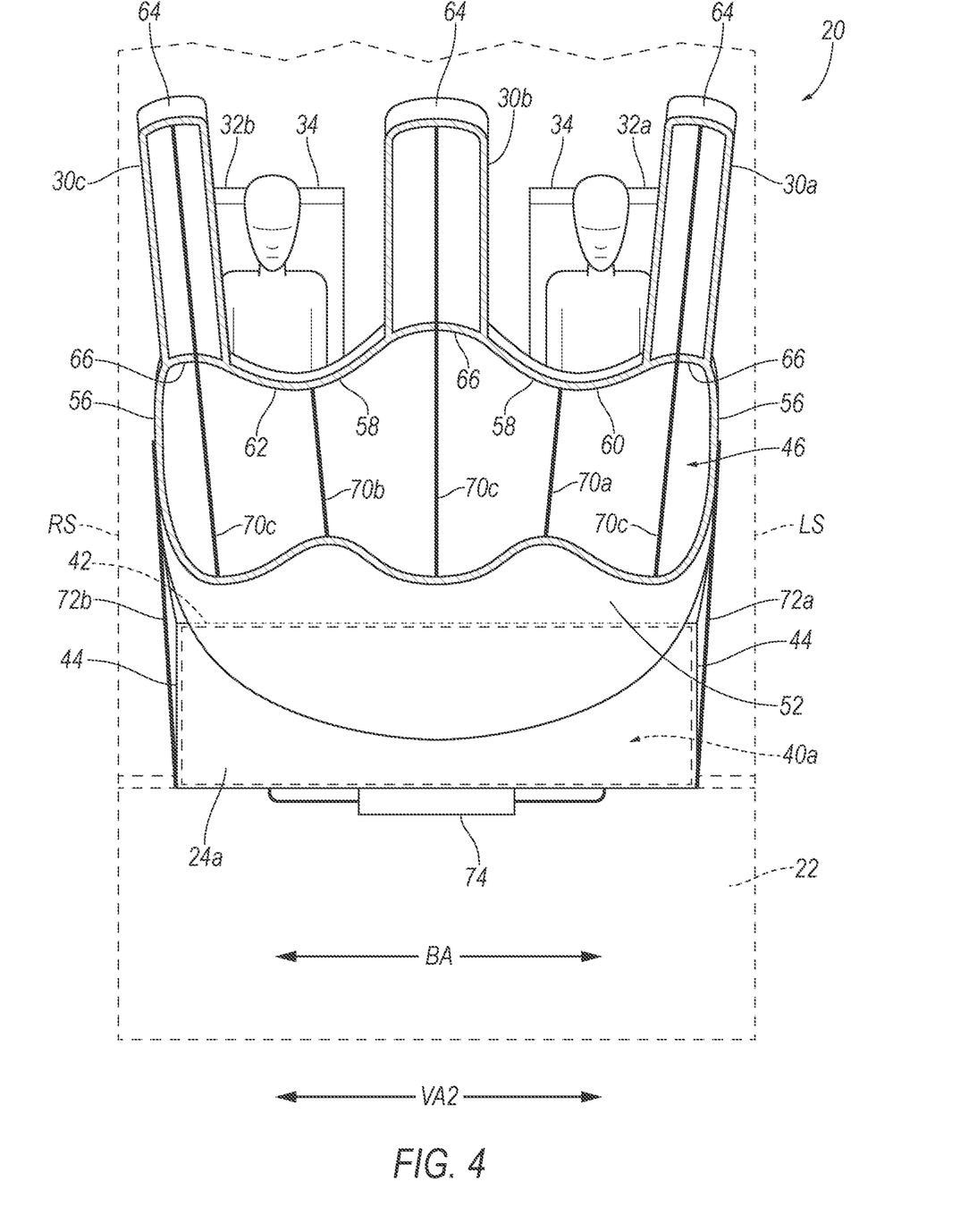
FIG. 4 is a top perspective view of the deployable base in the deployed position supporting the airbag in the inflated position with a break away to show internal tethers of the airbag.

With reference to FIGS. 3-5, each deployable base 24a, 24b defines a base inflation chamber 40a,40b that receives inflation medium to inflate the deployable base 24a, 24b to the deployed position. For example, the first deployable base 24a at the right-side RS of the vehicle 20 may define a first base inflation chamber 40a and the second deployable base 24b at the left-side LS of the vehicle 20 may define a second base inflation chamber 40b. The deployable bases 24a, 24b may be fluidly separated from each other, e.g., the first base inflation chamber 40a may be fluidly separated from the second base inflation chamber 40b. In other words, the first base inflation chamber 40a may be isolated from the second base inflation chamber 40b to inhibit fluid flow there between.

Each deployable base 24a, 24b may include a main panel 42 and side walls 44 that enclose the base inflation chamber 40a, 40b. The side walls 44 may extend from the main panel 42 toward the bulkhead 22. The side walls 44 may be folded, e.g., in an accordion fold pattern, when the deployable base 24a, 24b is at the stowed position. The side walls 44 may partially or fully unfold when the deployable base 24a, 24b is inflated to the deployed position. The side walls 44 of the deployable base 24a, 24b are solid, i.e., not woven, not fabric, etc. The main panel 42 and the side walls 44 may be unitary. In other words, the main panel 42 and the side walls 44 in combination are a single, uniform piece of material with no seams, joints, fasteners, or adhesives holding them to each other, i.e., are formed together simultaneously as a single continuous unit. As another example, the main panel 42 and the side walls 44 may be non-unitary, i.e., formed separately and subsequently assembled, e.g., by adhesive, welding, overmolding, etc. The deployable base 24a, 24b may be formed using any suitable manufacturing process, e.g., injection molding, blow molding, ultrasonic welding, etc. The deployable base 24a, 24b may include a class-A surface, e.g., the main panel 42 may be textured in the molding process to match another class-A surface in the vehicle 20. In other words, the main panel 42 can be integrated into vehicle 20 components without an additional covering. In another example, the deployable base 24a, 24b may include a covering supported by the main panel 42, the covering providing class-A surface that is exposed to view by a customer and free of unaesthetic blemishes and defects.

Each deployable base 24a, 24b may include a thermoplastic elastomer that aids in deployment characteristics such as controlling shape and size characteristics of the deployable base 24a, 24b in the deployed positions and may aid in packaging of the deployable base 24a, 24b. For example, the side walls 44, the main panel 42, and/or other components defining the base inflation chamber 40a, 40b may be thermoplastic elastomers. Thermoplastic elastomers have both thermoplastic and elastomeric properties. Example thermoplastic elastomers (TPEs) include styrenic block copolymers, thermoplastic olefins, elastomeric alloys, thermoplastic polyurethanes, thermoplastic copolyesters, and thermoplastic polyamides.

The deployable base 24a, 24b may be formed using any suitable manufacturing process, e.g., injection molding, blow molding, ultrasonic welding, etc. Specifically, the side walls 44 and the main panel 42 of the deployable base 24a, 24b may be manufactured to be unitary. Unitary means a single, uniform piece of material with no seams, joints, fasteners, or adhesives holding it together, i.e., formed together simultaneously as a single continuous unit. Specifically, the side walls 44 and the main panel 42 of the deployable base 24a, 24b are solid, i.e., not woven, fabric, sewn, etc. Non-unitary components, in contrast, are formed separately and subsequently assembled, e.g., by threaded engagement, welding, etc.

A TPE may be manufactured with a class-A surface, e.g., the TPE may be textured in the molding process to match another class-A surface in the vehicle 12. In other words, when the deployable base 24a, 24b are a TPE, the deployable base 24a, 24b may be integrated into vehicle components without an additional covering. For example, the deployable base 24a, 24b may be integrated into trim along the vehicle floor 14 or other vehicle components. The properties of the thermoplastic elastomer aids in inflation characteristics and the shape, size, and dimensions of the deployable base 24a, 24b in the inflated position.

Figure 1:
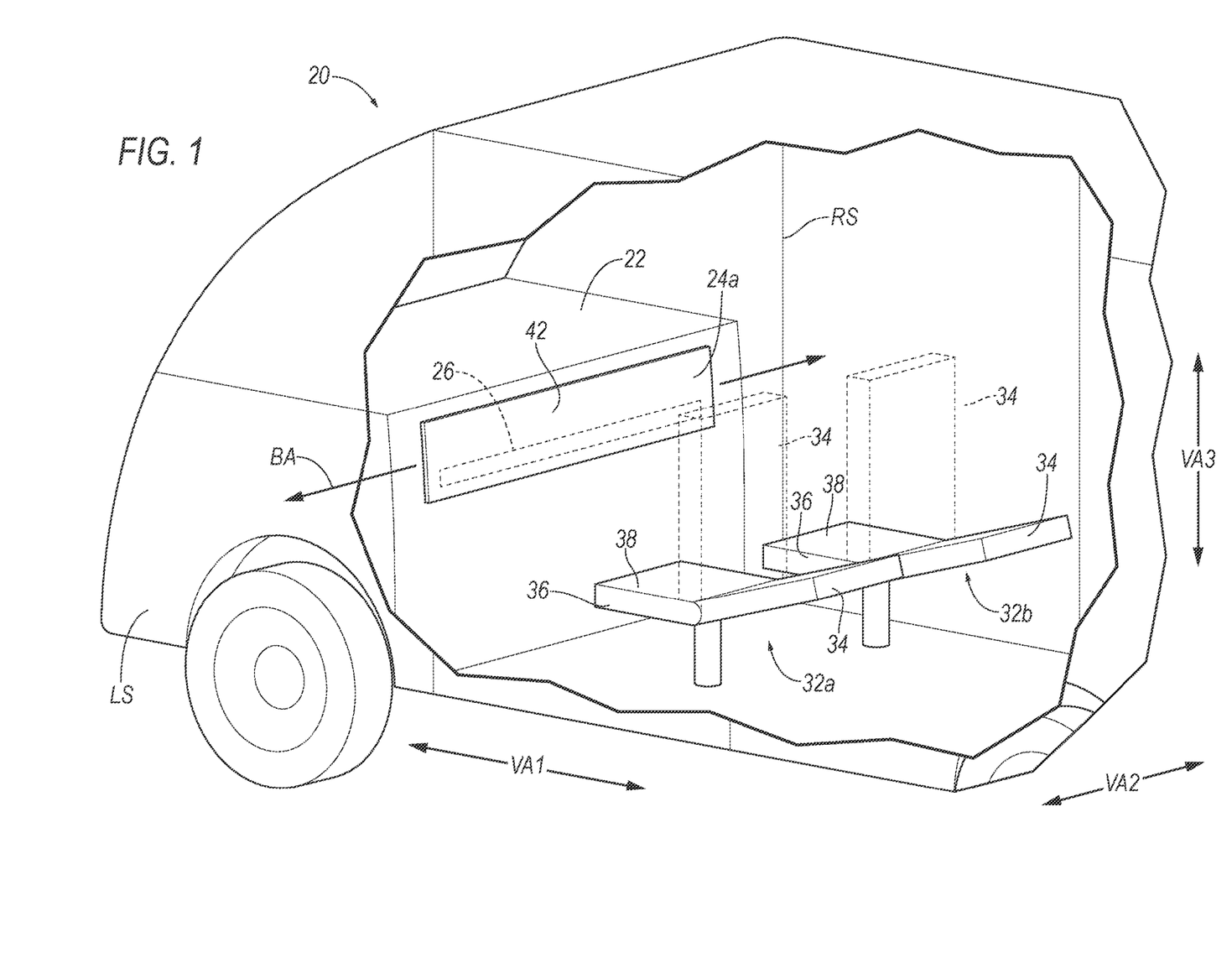
FIG. 1 is a perspective view of a portion of a vehicle with a break away to show a passenger cabin of the vehicle with a bulkhead and a deployable base.

The airbag 26 is inflatable from an uninflated position, shown in FIG. 1, away from the bulkhead 22 and the deployable base 24a, 24b(s) to the inflated position, shown in FIGS. 2-5. The airbag 26 in the inflated position may control kinematics of one or more occupants of the vehicle 20, e.g., during certain impacts to the vehicle 20. The airbag 26 defines an airbag inflation chamber 46 that receives inflation medium to inflate the airbag 26 to the inflated position. For example, one or more woven fabric panels of the airbag 26 may enclose the airbag inflation chamber 46. The airbag inflation chamber 46 may be comprised of a combination of one or more other chambers, e.g., a main chamber 48, extension chambers 50, etc. The airbag 26, i.e., panels defining the various chambers 46, 48, 50, may be woven fabric, e.g., a woven polymer yarn, strings, etc. As an example, the airbag 26 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The airbag 26 is supported by the deployable base 24a, 24b(s), e.g., by the first deployable base 24a, 24b and the second deployable base 24a, 24b. For example, the airbag 26 may be fixed to the main panels 42 of the deployable bases 24a, 24b, e.g., via a housing, bracket, fastener, etc. The airbag housing houses the airbag 26 in the uninflated position and supports the airbag 26 in the inflated position. The housing may extend from the first deployable base 24a, 24b to the second deployable base 24a, 24b. The airbag 26 may be rolled and/or folded to fit within the housing in the uninflated position. The airbag housing may be, e.g., a fabric, a polymer, a metal, a composite, or any combination of suitable materials. The deployable base 24a, 24b, the airbag housing, and/or the bulkhead 22 may include tear seams, doors, or other structure to permit inflation of the airbag 26. The deployable bases 24a, 24b may provide reaction surfaces to the airbag 26 in the inflated position.

The airbag 26 in the inflated position may be in front of the first seat 32a and/or the second seat 32b, e.g., to control kinematics of an occupant of the first seat 32a and/or an occupant of the second seat 32*b* during certain impacts to the vehicle 20. In other words, the airbag 26 in the inflated position may be spaced from the first seat 32*a* and the second seat 32*b* along the longitudinal axis VA1 and overlap the first seat 32*a* and/or the second seat 32*b* along the lateral axis VA2. The airbag 26 in the inflated position may be between the base and the first seat 32*a* and/or the second seat 32*b* along the longitudinal axis VA1.

Figure 2:
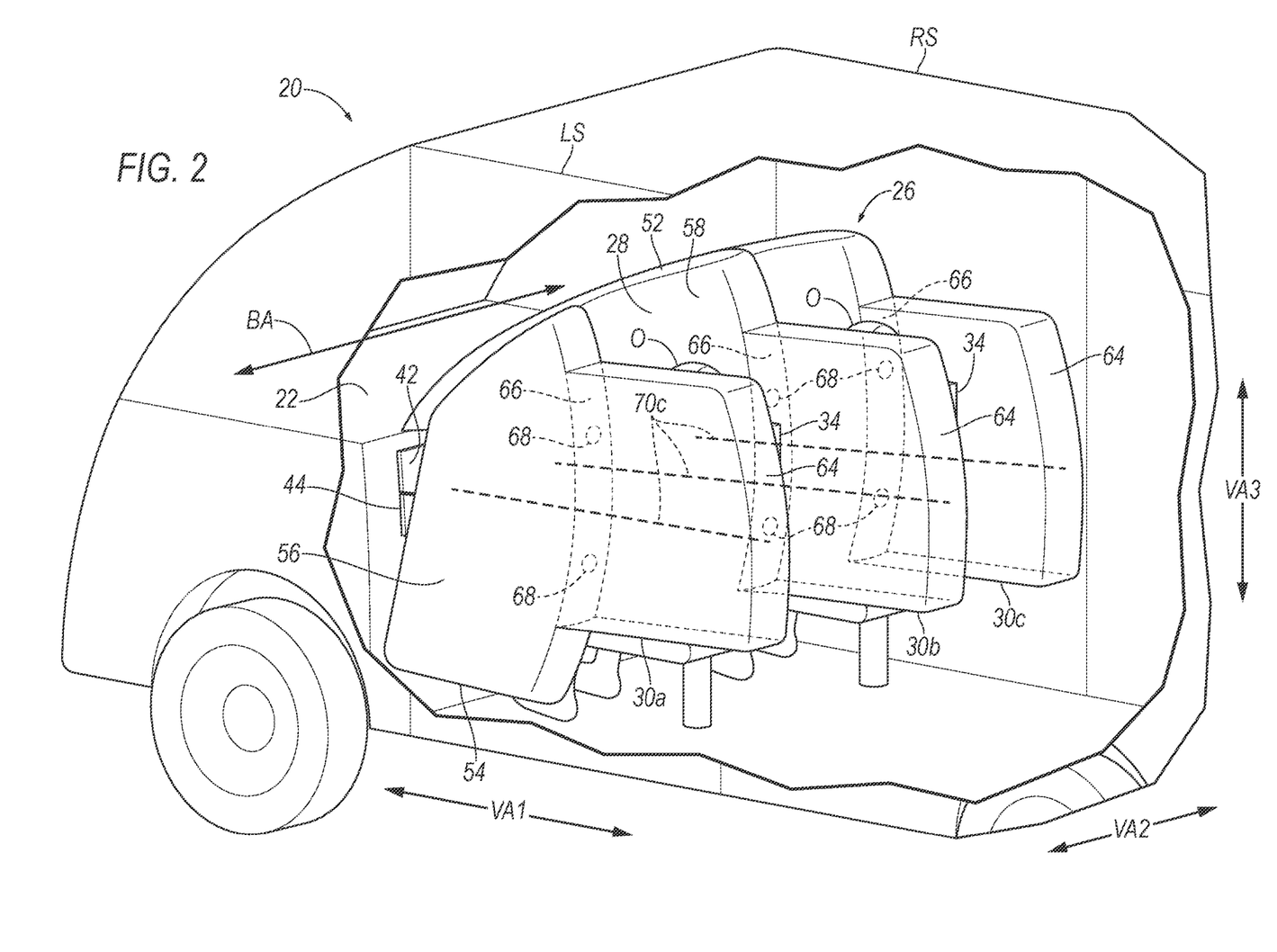
FIG. 2 is a perspective view of the portion of the vehicle of FIG. 1 with an airbag in an inflated position.

The main portion 28 of the airbag 26 includes one or more woven fabric panels defining the main chamber 48. For example, the main portion 28 may include a top panel 52, a bottom panel 54 and side panels 56 that extend, e.g., from the airbag housing, to impact panels 58. Occupants of the seat 32*a*, 32*bs* may contact the impact panel 58 during certain impacts to the vehicle 20. The main portion 28 of the airbag 26 in the inflated position may extend below the top surface 38 of the seat bottom 36, e.g., along the vertical axis VA3. For example, the bottom panel 54 may be below the seat bottom 36. The airbag 26 extending below the top surface 38 of the seat bottom 36 may control kinematics of legs of an occupant of the seat 32*a*, 32*b*. The top panel 52 may be above the seatback 34 and/or a head of an occupant O of the seat (as shown in FIG. 2). The main portion 28, e.g., the impact panel 58(*s*), may include a first concave portion 60 in front of the first seat 32*a* and/or a second concave portion 62 in front of the second seat 32*b*. The concave portions 60, 62 may receive the occupants during certain impacts to the vehicle 20 and control kinematics of the occupants along the longitudinal axis VA1 and the lateral axis VA2. The concave portions 60, 62 may curve toward the bulkhead 22 and away from the first seat 32*a* and the second seat 32*b*. The concave portions 60, 62 may be sized to receive a head of an opponent of the seat 32*a*, 32*b*, e.g., the head of a standard sized crash test dummy (such as a 50th Percentile Adult Male Hybrid III crash test dummy).

The extensions 30*a*, 30*b*, 30*c*, e.g., a first extension 30*a*, a second extension 30*b*, and a third extension 30*c*, of the airbag 26 extend away from the main portion 28 of the airbag 26 along longitudinal axis VA1, e.g., toward the seat 32*a*, 32*bs* to distal ends 64 of the respective extensions 30*a*, 30*b*, 30*c*. The extensions 30*a*, 30*b*, 30*c* may include one or more woven fabric panels that define the extension chambers 50 of the respective extensions 30*a*, 30*b*, 30*c*. The extension chambers 50 receive inflation medium, e.g., to inflate the extensions 30*a*, 30*b*, 30*c* to the inflated position. The extensions 30*a*, 30*b*, 30*c* may be spaced from each other along the axis BA of the bulkhead 22. For example, the extensions 30*a*, 30*b*, 30*c* may be spaced from each other along the lateral axis VA2 of the vehicle 20. The first extension 30*a* may outboard of the first seat 32*a*, e.g., abutting a door and/or window of the vehicle 20 body at the right-side RS of the vehicle 20. The second extension 30*b* may be outboard of the second seat 32*b*, e.g., abutting a door and/or window of the vehicle 20 body at the left-side LS of the vehicle 20. The third extension 30*c* may be between the first seat 32*a* and the second seat 32*b*, e.g., generally centered along the lateral axis VA2 of the vehicle 20. The concave portions 60, 62 may be between the extensions 30*a*, 30*b*, 30*c* along the axis BA, e.g., such that the head of an occupant received by one of the concave portions 60, 62 is between two of the extensions 30*a*, 30*b*, 30*c*. The extensions 30*a*, 30*b*, 30*c* may control lateral kinematics of the occupant during certain impact to the vehicle 20.

The airbag 26 in the inflated position may include internal panels 66 that separate the main chamber 48 from the extension chambers 50. The internal panels 66 may be woven fabric or any suitable material. The internal panels 66 may extend across openings of the impact panel 58 where the extensions 30*a*, 30*b*, 30*c* extend from the main portion 28. The internal panels 66 may control fluid flow between the main chamber 48 and the extension chambers 50. For example, the internal panels 66 may include one-way valves 68 that permit fluid flow into the extension chambers 50 from the main chamber 48 and inhibit fluid flow out of the extension chambers 50 to the main chamber 48. The one-way valves 68 may each include a port and a flap covering the port. Fluid pressure in the main chamber 48 may urge the flap away from the port and fluid pressure in the extension chamber 50 may urge the flap toward the port. When pressure is higher in the main chamber 48 than in the extension chamber 50 the flap may be urged away from the port to an opening position permitting fluid flow from the main chamber 48 into the extension chamber 50. When pressure is higher in the extension chamber 50 than in the main chamber 48 the flap may be urged against the port to a closed position inhibiting fluid flow from the extension chamber 50 into the main chamber 48. The one-way valve 68 may include any other suitable structure for controlling fluid flow.

The airbag 26 may include internal tethers 70*a*, 70*b*, 70*c* to control the shape and kinematics of the airbag 26 in the inflated position. The internal tethers 70*a*, 70*b*, 70*c* may be woven fabric or any suitable material. The internal tether may be fixed, e.g., to panels of the airbag 26, the airbag housing, the bulkhead 22, or any suitable structure via stitching, adhesive, fasteners, etc.

The internal tethers 70*a*, 70*b* may provide the first concave portion 60 and the second concave portion 62 of the airbag 26. For example, a first internal tether 70*a* may be fixed to the impact panel 58 of the airbag 26 at a position centered relative to the first seat 32*a* along the lateral axis VA2 and a second internal tether 70*b* may be fixed to the impact panel 58 of the airbag 26 between the first extension 30*a* and the second extension 30*b*, e.g., at a position centered relative to the seat 32*a*, 32*b* along the lateral axis VA2. Opposite ends of the first internal tether 70*a* and the second internal tether 70*b* may be fixed to the airbag 26 at a position spaced from the impact panel 58 along the longitudinal axis VA1, e.g., to the airbag housing or any suitable structure.

The internal tethers 70*c* may control kinematics of the extensions 30*a*, 30*b*, 30*c*. For example, the airbag 26 may include third internal tethers 70*c* fixed to the distal ends 64 of the extensions 30*a*, 30*b*, 30*c*. The third internal tethers 70*c* may extend into the main chamber 48. For example, the internal tethers 70*c* may extend from end panels at the distal ends 64 of the extensions 30*b*, 30*c*, i.e., spaced from the impact panels 58, through the respective extension chamber through the internal panels 66 (e.g. via a slot in the respective internal panel 66), and into the main chamber 48. One end of the third internal panels 66 may be fixed to the end panels of the extensions 30*a*, 30*b*, 30*c* and an opposite end of the third tether may be fixed to the main portion 28 of the airbag 26, the airbag 26 hosing, the bulkhead 22, or other suitable structure. As any alternative to extending through the panels 66, the internal tethers 70*c* may include sections, e.g., one section extending between and fixed to the end panel at the distal end 64 and the panel 66, and another section extending between and fixed to the panel 66 and the bulkhead 22 (or other suitable structure).

The airbag 26 may include one or more external tethers 72*a*, 72*b* to control the shape and kinematics of the airbag 26 in the inflated position. The external tethers 72*a*, 72*b* may be woven fabric or other suitable material. The external tethers 72*a*, 72*b* may be fixed to the airbag 26 and the bulkhead 22 or other suitable structure, e.g., via stitching, fastener, adhesive, etc. A first external tether 72a may be fixed to the airbag 26 and fixed to the bulkhead 22 at the first deployable base 24a. For example, one end of the first external tether 72a may be fixed to one the side panels 56 of the main portion 28 of the airbag 26 at the right-side RS adjacent, the first extension 30a and an opposite end of the first external tether 72a may be fixed to the bulkhead 22 at, e.g., adjacent, the first deployable base 24a. A second external tether 72b may fixed to the airbag 26 and fixed to the bulkhead 22, e.g., at the second deployable base 24b. For example, one end of the second external tether 72b may be fixed to the other of the side panels 56 of the main portion 28 of the airbag 26 at the left-side LS adjacent the second extension 30b and an opposite end of the second external tether 72b may be fixed to the bulkhead 22 at the second deployable base 24b.

One or more inflators 74 may be in fluid communication with the airbag 26 and the deployable bases 24a, 24b, e.g., via tubing or any suitable structure for directing inflation medium to the airbag inflation chamber 46 and/or the base inflation chamber 40a, 40b. The inflator(s) 74 inflate the deployable bases 24a, 24b and the airbag 26 with inflation medium, such as a gas, to inflate the deployable bases 24a, 24b to the deployed position and/or the airbag 26 to the inflated position. The inflator 74 may be, for example, a pyrotechnic inflator that ignites a chemical reaction to generate the inflation medium, a stored gas inflator that releases e.g., by a pyrotechnic valve stored gas as the inflation medium, or a hybrid. The inflator(s) 74 may be supported by any suitable component(s). For example, the inflator(s) 74 may be supported by the bulkhead 22, e.g., fixed thereto via fastener or the like. The deployable base 24a, 24b may be between the inflator 74 and the airbag 26, e.g., along the longitudinal axis VA1. The inflator 74 may be vehicle-forward of the deployable base 24a, 24b and the airbag 26 may be vehicle-rearward of the deployable base 24a, 24b. The inflator(s) 74 may be, for example, at least partially in the airbag inflation chamber 46 and/or the base inflation chamber 40a, 40b to deliver inflation medium directly to the airbag inflation chamber 46 and/or the base inflation chamber 40a, 40b. As another example, the inflator (s) 74 may be connected to the airbag inflation chamber 46 and/or the base inflation chamber 40a, 40b through fill tubes, diffusers, etc.

The inflator 74 may be a multiple stage inflator in which the inflation medium is provided at different stages that are physically and/or temporally separate from each other. For example, the inflator 74 may be a multi-stage inflator with one stage in fluid communication with the airbag inflation chamber 46 and another stage in fluid communication with the base inflation chamber(s) 40a, 40b. In other words, the inflator 74 may include a first stage that is operatively coupled to the deployable base 24a, 24b to provide inflation medium to the base inflation chamber(s) 40a, 40b, and the inflator 74 may include a second stage that is operatively coupled to the airbag 26 to provide inflation medium to the airbag inflation chamber 46. As another example, the inflator 74 may be a single-stage inflator in fluid communication with the airbag inflation chamber 46 and the base inflation chamber(s) 40a, 40b. In another example, individual inflators 74 may in fluid communication with each of the airbag inflation chamber 46 and the base inflation chamber(s) 40a, 40b.

Figure 6:
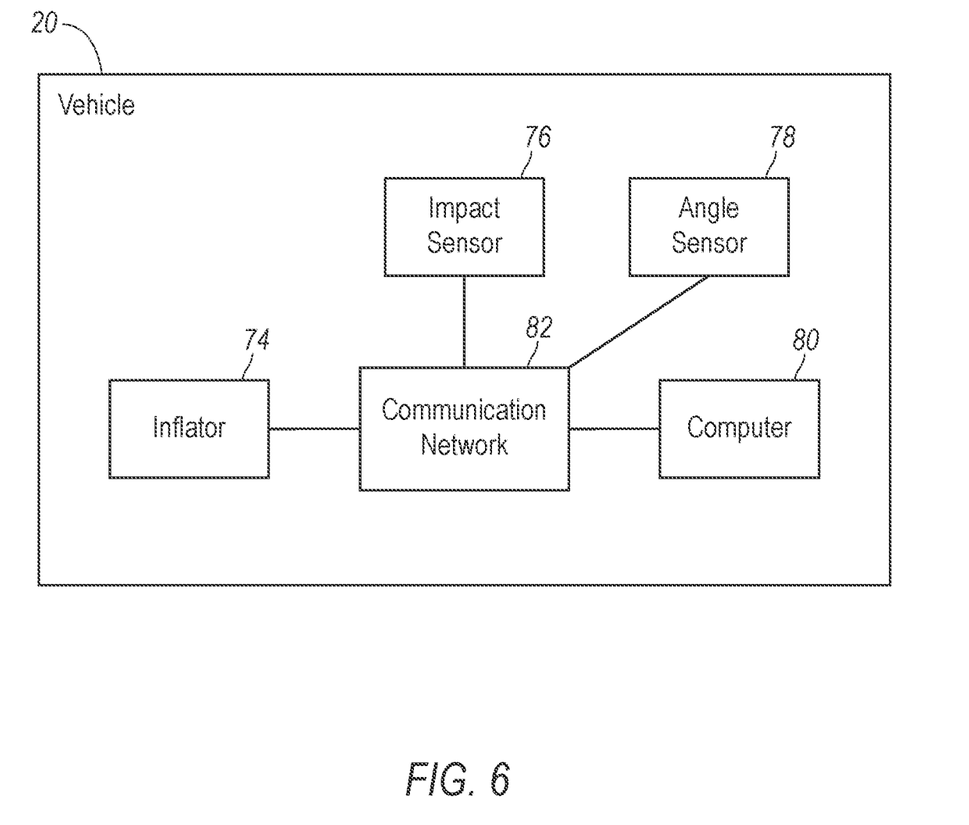
FIG. 6 is a block diagram of components of the vehicle.

With reference to FIG. 6, the vehicle 20 can include an impact sensor 76 that is configured to detect an impact to the vehicle 20. The impact sensor 76 may be of any suitable type, for example, post-contact sensors such as accelerometers, pressure sensors, and contact switches; and pre-impact sensor 76s such as radar, LIDAR, and vision-sensing systems. The vision-sensing systems may include one or more cameras, CCD image sensors, CMOS image sensors, etc. The impact sensor 76 may be located at numerous points in or on the vehicle 20.

The vehicle 20 may include an angle sensor 78 configured to detect an angle between the seat bottom 36 and the seatback 34. The angle sensor 78 may be, for example, a proximity sensor, a touch sensor, a hall effect sensor, a rotary encoder, a camera, a switch, or any other suitable sensor that can generate a signal indicate the angle between the seat bottom 36 and the seatback 34. The angle sensor 78 can be supported by the seat bottom 36, the seatback 34, or any suitable structure. The angle sensor 78 may be in communication with the computer 80. In other words, the computer 80 may receive a signal from the angle sensor 78 indicating angle between the seat bottom 36 and the seatback 34.

The vehicle 20 may include a computer 80 to control inflation of the deployable base(s) 24a, 24b and the airbag 26. The computer 80 is generally arranged for communications on a communication network 82 that can include a bus in the vehicle 20 such as a controller area network (CAN) or the like, and/or other wired and/or wireless mechanisms. Via the communication network 82, the computer 80 may transmit messages to various devices in the vehicle 20, and/or receive messages (e.g., CAN messages) from the various devices, e.g., the inflator 74, the impact sensor 76, the angle sensor 78, etc. Alternatively or additionally, in cases where the computer 80 comprises a plurality of devices, the communication network 82 may be used for communications between devices represented as the computer 80 in this disclosure.

The computer 80 includes a processor and a memory. The memory includes one or more forms of computer readable media, and stores instructions executable by the processor for performing various operations, processes, and methods, as disclosed herein. For example, the computer 80 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 80 may be a restraints control module. In another example, computer 80 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured deployable base 24a, 24bd on VHDL programming provided pre-manufacturing, whereas logical components inside an FPGA may be configured deployable based on VHDL programming, e.g., stored in a memory electrically connected to the FPGA circuit. In some examples, a combination of processor(s), ASIC(s), and/or FPGA circuits may be included in the computer 80. The memory can be of any type, e.g., hard disk drives, solid state drives, servers, or any volatile or non-volatile media. The memory can store the collected data sent from the sensors.

Figure 7:
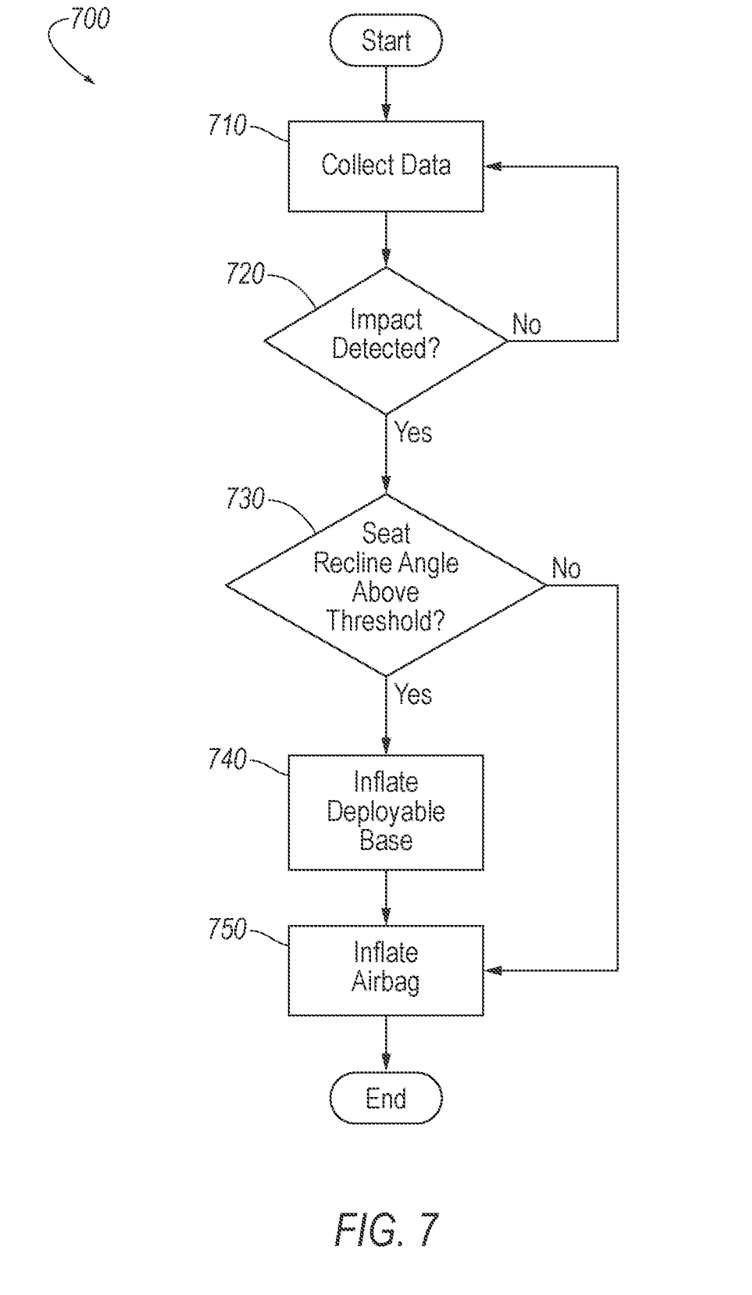
FIG. 7 is a flow chart illustrating a method for controlling the deployable base(s) and the airbag.

FIG. 7 is a process flow diagram illustrating an exemplary process 700 for controlling the deployable base 24a, 24b and the airbag 26. The process 700 may be performed by the computer 80. In other words, the memory of the computer 80 may store instructions executable by the process to perform the process 700. The process 700 begins in a block 7710, in which the computer 80 collects data, e.g., received from the angle sensor 78, the impact sensor 76, etc., e.g., via the communication network 82. The computer 80 may continue to receive data throughout the process 700. Throughout the process 700 in the present context means substantially continuously or at time intervals, e.g., every 100 milliseconds. The computer 80 36 may store such data.

Next, at a block 720 the computer 80 determines whether an impact to the vehicle 20 is detected. The computer 80 may detect the impact based on information received from the impact sensor 76s via the communication network 82. In response to detecting the impact to the vehicle 20 the computer 80 moves to a Block 730. Else, the computer 80 may return to the block 710.

At the block 730 the computer 80 determines whether a recline angle of the seatback 34 relative to the seat bottom 36 is greater than a threshold, e.g., an angle of 110 degrees. The computer 80 may detect the recline angle of the seatback 34 based on information from the angle sensor 78, and compare the detected angle indicated in the information from the angle sensor 78 with the threshold. The threshold may be predetermined and stored in memory of the computer 80. The threshold may be empirically predetermined, e.g., with actual and/or simulation based empirical testing utilizing crash test dummies seated at various recline angles and the deployable base 24a, 24bd at various positions. The threshold may generally define a boundary between "upright" seat 32a, 32bing positions and "reclined" seat 32a, 32bing positions. In response to determining the recline angle is greater than the threshold the computer 80 moves to a block 740. In response to determining the recline angle is not greater than the threshold the computer 80 moves to a block 750, i.e., bypassing the block 740 and refraining from inflating the deployable bases 24a, 24b.

At the block 740 the computer 80 commands inflation of the deployable bases 24a, 24b to the deployed position. For example, the computer 80 may provide impulses to pyrotechnic charges of both the first stage and the second stage of the inflator 74 in fluid communication with the deployable base 24a, 24b. After the block 740 the computer 80 moves to a block 750.

At the block 750 the computer 80 commands inflation of the airbag 26. For example, the computer 80 may provide a pulse to the pyrotechnic material of the stage of the inflator 74 in fluid communication with the airbag 26. The airbag 26 in the inflated position may control kinematics of one or more occupants of the vehicle 20.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer 58. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
  a first seat;
  a second seat;
  a bulkhead elongated along an axis;
  a base supported by the bulkhead and inflatable from a stowed position away from the bulkhead to a deployed position; and
  an airbag supported by the base and inflatable away from the bulkhead and the base to an inflated position, the airbag in the inflated position having a main portion and extensions extending away from the main portion along a vehicle-longitudinal axis, the extensions including a first extension outboard of the first seat, a second extension outboard of the second seat, and a third extension between the first seat and the second seat, the extensions being spaced from each other along the axis.

2. The vehicle of claim 1, wherein the base includes side walls that define an inflation chamber and are a thermoplastic elastomer, and wherein the airbag includes woven fabric that defines a second inflation chamber.

3. The vehicle of claim 1, wherein the main portion of the airbag in the inflated position defines a main chamber and the extensions of the airbag in the inflated position define extension chambers, and wherein the airbag in the inflated position includes internal panels separating the main chamber from the extension chambers.

4. The vehicle of claim 3, wherein the internal panels include one-way valves that permit fluid flow into the extension chambers and inhibit fluid flow out of the extension chambers.

5. The vehicle of claim 1, wherein the airbag includes an impact panel between the first extension and the second extension, and wherein the impact panel is concave away from the first seat.

6. The vehicle of claim 5, wherein the airbag includes an internal tether fixed to the impact panel between the first extension and the second extension.

7. The vehicle of claim 1, wherein the extensions include distal ends, and wherein the airbag includes internal tethers fixed to the distal ends of the extensions.

8. The vehicle of claim 7, wherein the internal tethers extend into the main chamber.

9. The vehicle of claim 1, further comprising a second base supported by the bulkhead and inflatable from a second stowed position away from the bulkhead to a second deployed position, the airbag supported by the second base.

10. The vehicle of claim 9, wherein the base is spaced from the second base along the axis.

11. The vehicle of claim 10, further comprising an external tether fixed to the airbag and the bulkhead.

12. The vehicle of claim 1, further comprising an inflator in fluid communication with the airbag and the base.

13. The vehicle of claim 1, further comprising a seat facing the bulkhead, the seat having a seatback, the seatback being reclinable, the airbag in the inflated position being in front of the seat.

14. The vehicle of claim 13, further comprising a computer having a processor and a memory storing instructions executable by the processor to:

in response to both detecting that a recline angle of the seatback is greater than a threshold and based on information from an impact sensor, command the base to the deployed position and command the airbag to the inflated position, and in response to both detecting that the recline angle of the seatback is not greater than the threshold and based on information from the impact sensor, command the airbag to the inflated position and refrain from commanding the base to the deployed position.

15. A vehicle, comprising:
a bulkhead;
a first base supported by the bulkhead and inflatable from a stowed position away from the bulkhead to a deployed position;
a second base supported by the bulkhead and inflatable from a second stowed position away from the bulkhead to a second deployed position; and
an airbag supported by the first base and the second base, the airbag inflatable away from the bulkhead and the base to an inflated position.

16. The vehicle of claim 15, wherein the first base defines a first base chamber and the second base defines a second base chamber fluidly separated from the first base chamber.

17. The vehicle of claim 15, further comprising an inflator in fluid communication with the first base, the second base, and the airbag.

18. The vehicle of claim 15, wherein the first base and the second base each include thermoplastic and the airbag includes woven fabric.

19. The vehicle of claim 15, further comprising a first tether fixed to the airbag and fixed to the bulkhead at the first base, and further comprising a second tether fixed to the airbag and fixed to the bulkhead at the second base.

* * * * *